(12) United States Patent
Muttik (10) Patent No.: US 10,127,379 B2
(45) Date of Patent: Nov. 13, 2018

(54) PROFILING CODE EXECUTION

(71) Applicant: McAfee, LLC, Santa Clara, CA (US)

(72) Inventor: Igor Muttik, Berkhamsted (GB)

(73) Assignee: McAfee, LLC, Santa Clara, CA (US)

( * ) Notice: Subject to any disclaimer, the term of this patent is extended or adjusted under 35 U.S.C. 154(b) by 0 days.

(21) Appl. No.: 13/801,650

(22) Filed: Mar. 13, 2013

(65) Prior Publication Data

US 2014/0283076 A1    Sep. 18, 2014

(51) Int. Cl.
*G06F 21/00* (2013.01)
*G06F 21/55* (2013.01)
*G06F 21/56* (2013.01)

(52) U.S. Cl.
CPC ............ *G06F 21/554* (2013.01); *G06F 21/56* (2013.01); *G06F 21/566* (2013.01)

(58) Field of Classification Search
CPC ........ G06F 21/72; G06F 21/629; G06F 21/00; G06F 21/53; G06F 21/56; G06F 21/602; G06F 21/566; G06F 21/554; G06F 21/564; G06F 21/52; G06F 21/552; G06F 21/561; H04L 63/1416
See application file for complete search history.

(56) References Cited

U.S. PATENT DOCUMENTS

| 5,696,822 | A | 12/1997 | Nachenberg | |
|---|---|---|---|---|
| 7,620,992 | B2 | 11/2009 | Monastyrsky et al. | |
| 7,818,807 | B1 * | 10/2010 | McCorkendale et al. | ...... 726/24 |
| 7,934,103 | B2 | 4/2011 | Kidron | |
| 8,065,728 | B2 | 11/2011 | Wang et al. | |
| 8,370,931 | B1 * | 2/2013 | Chien et al. | ..................... 726/22 |
| 8,555,385 | B1 * | 10/2013 | Bhatkar | ................ G06F 21/556 |
| | | | | 726/22 |
| 8,694,833 | B2 * | 4/2014 | Keromytis et al. | .......... 714/38.1 |
| 2003/0101381 | A1 * | 5/2003 | Mateev et al. | ................... 714/38 |
| 2008/0040710 | A1 * | 2/2008 | Chiriac | ......................... 717/136 |

(Continued)

FOREIGN PATENT DOCUMENTS

| WO | 2012/135192 | | 10/2012 |
|---|---|---|---|
| WO | 2013/015994 | A1 | 1/2013 |
| WO | 2014/158760 | A1 | 10/2014 |

OTHER PUBLICATIONS

International Search Report and Written Opinion received for PCT Patent Application No. PCT/US2014/019939, dated Jun. 2, 2014, 12 pages.

(Continued)

*Primary Examiner* — Farid Homayounmehr
*Assistant Examiner* — Christopher C Harris
(74) *Attorney, Agent, or Firm* — Byrne Poh LLP (57) ABSTRACT

Technologies for securing an electronic device may include determining a plurality of rules, monitoring execution of the electronic device, generating a notification that one of the operations has occurred based upon the rules, and, based on the notification and the pattern of the operations, determining whether the operations are indicative of malware. The rules may include an identification of a plurality of entities of the electronic device to be monitored, an identification of one or more operations between the entities to be monitored, and an identification of a pattern of the operations to be monitored.

20 Claims, 4 Drawing Sheets

(56) References Cited

U.S. PATENT DOCUMENTS

| | | | |
|---|---|---|---|
| 2009/0070878 A1* | 3/2009 | Wang | G06F 21/554 |
| | | | 726/24 |
| 2009/0199296 A1* | 8/2009 | Xie et al. | 726/23 |
| 2010/0031353 A1* | 2/2010 | Thomas et al. | 726/22 |
| 2011/0016363 A1* | 1/2011 | Washio | 714/57 |
| 2012/0222120 A1* | 8/2012 | Rim et al. | 726/24 |
| 2012/0254993 A1 | 10/2012 | Sallam | |
| 2012/0255002 A1* | 10/2012 | Sallam | 726/23 |
| 2013/0036314 A1* | 2/2013 | Glew et al. | 713/194 |
| 2013/0091571 A1* | 4/2013 | Lu | 726/23 |
| 2013/0333040 A1* | 12/2013 | Diehl | G06F 9/46 |
| | | | 726/24 |
| 2014/0115652 A1* | 4/2014 | Kapoor et al. | 726/1 |

OTHER PUBLICATIONS

Korean Office Action, Application No. 2015-7021835; 14 pages with translation, dated May 18, 2016.
Office Action received from Korean Patent Application No. 2015-7021835, dated Nov. 1, 2016; 5 pages.
Extended European Search Report for Application No. 14774241.5, dated Sep. 23, 2016; 9 pages.
Egele, Manuel, et al. "A survey on automated dynamic malware-analysis techniques and tools." ACM Computing Surveys (CSUR) 44.2 (2012); 50 pages.
Office Action received for Chinese Patent Application No. 201480008711.1, dated Apr. 19, 2017; 10 pages.
Office Action received for Chinese Patent Application No. 201480008711.1, dated Dec. 4, 2017; 22 pages.
Office Action dated Apr. 28, 2018 in CN Patent Application No. 201480008711.1.

* cited by examiner

PROFILING CODE EXECUTION

TECHNICAL FIELD

Embodiments of the present invention relate generally to computer security and malware protection and, more particularly, to profiling code execution.

BACKGROUND

Malware infections on computers and other electronic devices are very intrusive and hard to detect and repair. Anti-malware solutions may require matching a signature of malicious code or files against evaluated software to determine that the software is harmful to a computing system. Malware may disguise itself through the use of polymorphic programs or executables wherein malware changes itself to avoid detection by anti-malware solutions. In such case, anti-malware solutions may fail to detect new or morphed malware in a zero-day attack. Malware may include, but is not limited to, spyware, rootkits, password stealers, spam, sources of phishing attacks, sources of denial-of-service-attacks, viruses, loggers, Trojans, adware, or any other digital content that produces unwanted activity.

BRIEF DESCRIPTION OF THE DRAWINGS

For a more complete understanding of embodiments of the present invention and its features and advantages, reference is now made to the following description, taken in conjunction with the accompanying drawings, in which.

DESCRIPTION OF EMBODIMENTS

Figure 1:
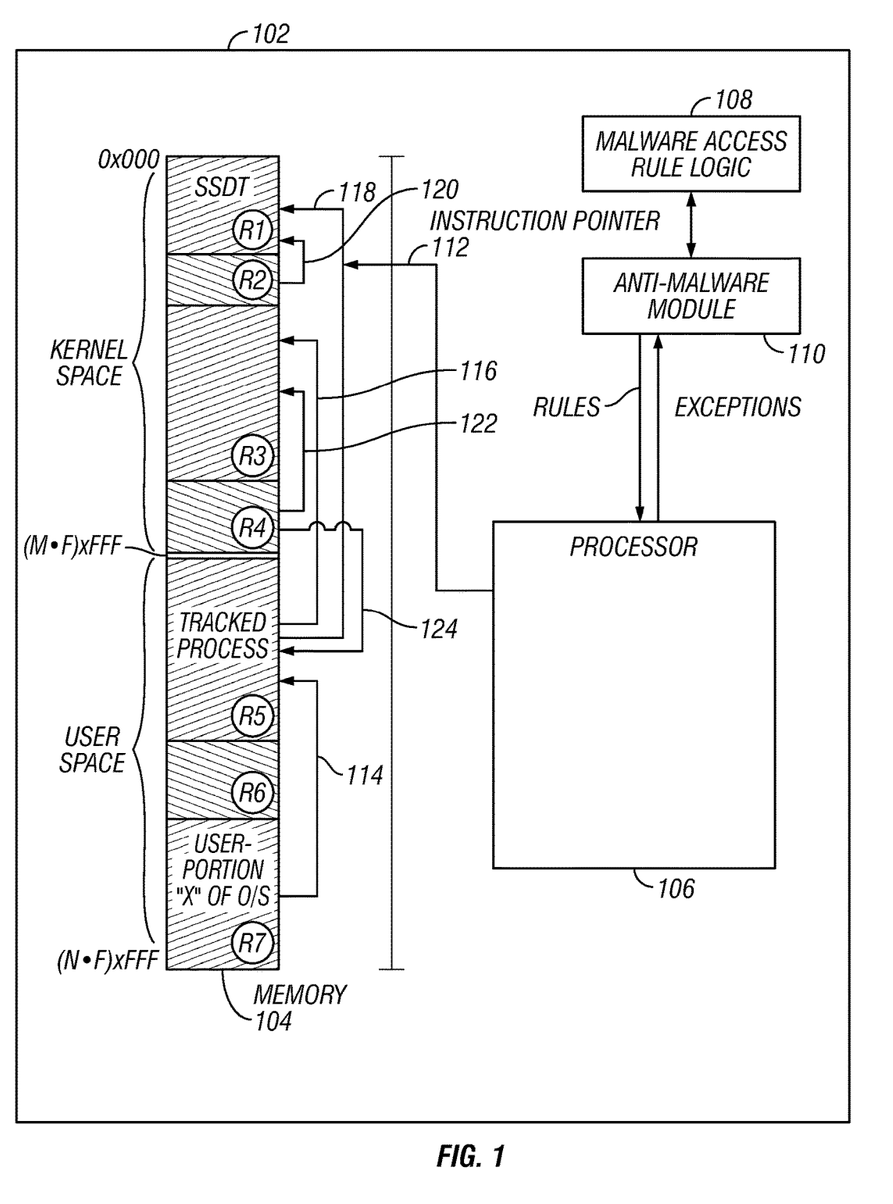
FIG. 1 is an illustration of an example embodiment of a system 100 for profiling code execution.

FIG. 1 is an illustration of an example embodiment of a system 100 for profiling code execution. System 100 may be configured to profile the execution of code on an electronic device as it is dynamically loaded and executed. By profiling the execution of code, system 100 may monitor the execution for patterns of execution that indicate malware. In one embodiment, system 100 may perform such monitoring without the use of operating system or application hooking. In another embodiment, system 100 may perform such monitoring through the use of exception loading on a processor. In yet another embodiment, system 100 may perform profiling of code execution by recording and evaluating transitions between different address spaces.

System 100 may include an anti-malware module 110 configured to evaluate whether an electronic device 102 is infected with malware. Anti-malware module 110 may be resident upon electronic device 102 or upon an electronic device communicatively coupled to electronic device 102. Anti-malware module 110 may be communicatively coupled to a processor 106 of electronic device 102 and to malware-access rule logic 108. Anti-malware module 110 may be configured to access malware-access rule logic 108 to determine what portions of a memory 104 of electronic device to monitor. Furthermore, anti-malware module 110 may be configured to access malware-access rule logic 108 to determine what transitions from a given portion of memory to another to monitor. Anti-malware module 110 may be configured to define such rules into processor 106 by, for example, configuring processor 106 to generate exceptions when a transition occurs between a first defined address space (or range) to a second defined address space (or range). Processor 106 may be configured to send a resulting exception to anti-malware module 110. Anti-malware module 110 may be configured to access malware-access rule logic 108 to determine whether a transition detected by processor 106—along with previously determined transitions—fulfills a sequence, state graph model, or other rule that is associated with malware.

Malware-access rule logic 108 may be resident upon electronic device 102, or upon any other electronic device that is accessible by anti-malware module 110. In one embodiment, malware-access rule logic 108 may be resident upon an anti-malware server on a network communicatively coupled to anti-malware module 110. In another embodiment, malware-access rule logic 108 may be loaded in memory 104, processor 106, or anti-malware module 110. Malware-access rule logic 108 may be implemented in any suitable manner, such as with a server, proxy, application, module, script, library, function, logic, database, file, table, or other data structure or entity. Malware-access rule logic 108 may include any suitable information for defining regions of memory 104 to monitor, transitions to monitor, I/O ports to monitor, memory areas for reading or writing, or sequences of transitions that indicate malware.

Malware-access rule logic 108 may include positive rules, by which a monitored operation or sequence is recognized as safe, or negative rules, by which a monitored operation or sequence is recognized as malicious. Furthermore, malware may manipulate an expected order of execution in legitimate software, such that individual operations are not malicious and are in fact related to legitimate software, but are conducted in a sequence such that the order of such operations is malicious. Such malware may include, for example, return-oriented programming (ROP). By use of positive rules in combination rules, one or more "false positive" identifications of malware may be eliminated.

Electronic device 102 may be implemented in any suitable manner. For example, electronic device 102 may include a mobile device, computer, server, laptop, desktop, board, or blade.

Anti-malware module 110 may be implemented in any suitable manner. For example, anti-malware module 110 may include instructions, logic, functions, libraries, shared libraries, applications, scripts, programs, executables, objects, analog circuitry, digital circuitry, or any suitable combination thereof.

Processor 106 may comprise, for example, a microprocessor, microcontroller, digital signal processor (DSP), application specific integrated circuit (ASIC), or any other digital or analog circuitry configured to interpret and/or execute program instructions and/or process data. In some embodiments, processor 106 may interpret and/or execute program instructions and/or process data stored in memory 104. Memory 104 may be configured in part or whole as application memory, system memory, or both. Memory 104 may include any system, device, or apparatus configured to hold and/or house one or more memory modules. Each memory module may include any system, device or apparatus configured to retain program instructions and/or data for a period of time (e.g., computer-readable storage media). Instructions, logic, or data for configuring the operation of system 100, such as configurations of components such as electronic device 102 or anti-malware module 110 may reside in memory 104 for execution by processor 106.

Processor 106 may execute one or more code instruction(s) to be executed by the one or more cores of the processor. The processor cores may follow a program sequence of instructions indicated by the code instructions. Each code instruction may be processed by one or more decoders of the processor. The decoder may generate as its output a micro operation such as a fixed-width micro operation in a predefined format, or may generate other instructions, microinstructions, or control signals which reflect the original code instruction. Processor 106 may also include register renaming logic and scheduling logic, which generally allocate resources and queue the operation corresponding to converted instructions for execution. After completion of execution of the operations specified by the code instructions, back end logic within processor 106 may retire the instruction. In one embodiment, processor 106 may allow out of order execution but requires in order retirement of instructions. Retirement logic within processor 106 may take a variety of forms as known to those of skill in the art (e.g., re-order buffers or the like). The processor cores of processor 106 are thus transformed during execution of the code, at least in terms of the output generated by the decoder, the hardware registers and tables utilized by the register renaming logic, and any registers modified by the execution logic.

Anti-malware module 110 may be configured to define any suitable portion of memory 104 for monitoring. Anti-malware module 110 may make such definitions through referencing, for example, malware-access rule logic 108. For example, anti-malware module 110 may define the portions of memory 104 used for kernel mode operation. In the example of FIG. 1, anti-malware module 110 may define that kernel space, including the memory addresses from (0x000) to ((M*F)xFFF) is to be monitored as a region. In another example, anti-malware module 110 may define the portions of memory 104 used for user mode operation is to be monitored as a region. In the example of FIG. 1, anti-malware module 110 may define that user space, including the memory addresses from ((M*F)xFFF) to ((N*F) xFFF), is to be monitored as a region.

Specific applications, processes, or threads may be identified for monitoring by anti-malware module 110. These may be dynamically tracked as they are loaded into memory 104. In the example of FIG. 1, anti-malware module 110 may define that a particular tracked process, as loaded in the region denoted by R5, is to be monitored. The tracked process may represent a process for which it is unknown whether the process is associated with malware.

Specific portions of an operating system may be identified for monitoring by anti-malware module 110. These portions may be dynamically tracked as they are loaded into memory 104. Memory for any suitable portion of an operating system may be monitored. In the example of FIG. 1, anti-malware module 110 may define that a system service dispatch table (SSDT) as loaded in the region denoted by R1 and a user-portion "X" of an operating system as loaded in the region denoted by R7 may be monitored. Specific elements within regions or operating system constructs, such individual pointers in an SSDT, may be monitored. Such individual pointers may indicate access of specific, identified functions managed by the SSDT.

Other entities that may be monitored as they reside in memory 104 may include, for example, system shared libraries—including dynamically linked libraries (DLLs), interrupt descriptor tables (IDT), system call tables, user shared libraries, or operating system call dispatchers. Such entities may be used in any suitable operating system. Other regions of memory 104 may be defined, such as regions R2, R3, R4 of kernel space and region R6 of user space.

Furthermore, anti-malware module 110 may be configured to identify particular transitions, reads, writes, executions, attribute changes, or I/O port attribute changes to be used for profiling code executions. The particular transitions and accesses may be defined in malware-access rule logic 108. Example transitions are illustrated in FIG. 1 and may include: a transition 114 from a known portion of user space such as the user-portion "X" of the operating system in R7 to the tracked process in R5; a transition 124 from unidentified entities in kernel space in R4 to the tracked process in R5; a transition 122 from one unidentified entity in kernel space in R4 to another unidentified entity in kernel space in R3; a transition 118 from the tracked process in R4 to a known entity in kernel space such as SSDT in R1; a transition 116 from the tracked process in R4 to an unidentified entity in kernel space in R3; or a transition 120 from an unknown entity in kernel space in R2 to a known entity in kernel space such as SSDT in R1.

In addition, anti-malware module 110 may be configured to identify particular aspects of transitions for the purposes of profiling code executions. The particular aspects may be defined in malware-access rule logic 108. In one embodiment, the specific direction of a transition may be evaluated. For example, a transition between R1 to R2 may be distinguished from a transition between R2 to R1. Thus, malware-access rule logic 108 may require that a given transition is to be matched in a specified direction. In another embodiment, the distance of a transition may be evaluated. For example, a transition from one memory space to a nearby memory space may be sufficiently short so as to represent a transition that is to be ignored. Thus, malware-access rule logic 108 may provide an exception for a transition if the transition is made across less than a threshold amount of memory addresses. Such a threshold may include, for example, fifty bytes. In yet another embodiment, a count of a transition may be evaluated. For example, a transition from one monitored region to another may be repeated multiple times, and only upon a certain number of such repeated transitions will the execution be deemed worthy of applying malware-access rule logic 108. Thus, malware-access rule logic 108 may specify that a transition is to be matched upon an n-th time such a transition occurs. Previous or subsequent instances of such transitions may be ignored. In still yet another embodiment, conditionals may be placed upon transitions, such that logic, including NOT, AND, OR, XOR, or other such operations may be applied to one or more transitions. For example, a particular transition may be matched as long as another identified transition has not yet been encountered. Thus, malware-access rule logic 108 may specify conjugate or complex logical conditions for matching transitions.

Transitions such as transitions 114, 116, 118, 120, 122, and 124 may be defined as branches in execution between different regions of memory 104. In one embodiment, a jump in execution may be evaluated according to addresses loaded into an instruction pointer 112 of processor 106. Memory addresses of a given range loaded into instruction pointer 112 before execution may be compared to memory addresses of another given range loaded into instruction pointer 112 after execution. The change in memory ranges associated with instruction pointer 112 before and after execution may reflect a JMP instruction, a CALL instruction, or other instruction for branching execution between entities resident in memory 104. In another embodiment, reads, writes, or executions of memory addresses may define branches of execution, wherein subsequent reads, writes, or executions of memory that are in disparate portions of memory 104 may be considered transitions. In yet another embodiment, instruction fetching may be used to determine a point of execution in memory 104.

Timing and instruction counts may also be taken into account in malware-access rule logic 108. For example, if a time interval—such as that determining by a central processing unit counter—between two transitions is too long or too short then a given rule may not apply. Similarly, if an instruction counter is below or above a threshold then the state of matching a rule may be reset to an initial state.

While a single processor 106 is illustrated in FIG. 1, system may include multiple processors. Furthermore, processor 106 may include multiple cores or central processing units. Profile execution performed by system 100 may be conducted on a per-processor, per-core, or per-central processing unit basis. Furthermore, such profile execution may be conducted on a per-process or per-thread basis on any such processor, core, or central processing unit.

The illustration of code execution profiling with transitions in FIG. 1 is made with reference to contiguous memory. Such profiling may include profiling of entities as such entities are resident within virtual memory. In one embodiment, the profiling of code execution may be accomplished by reference to physical addresses underlying the virtual memory.

As described above, anti-malware module 110 may access malware-access rule logic 108 to determine any suitable number or kind of transitions that are to be monitored. In one embodiment, rules, indications, or logic for such transitions that are to be monitored may be loaded into, for example, processor 106 or into a random-access-memory controller coupled to processor 106. Upon encountering such a transition defined by the rules, processor 106 may generate a page fault, interrupt, or an exception that may be handled by anti-malware module 110. In another embodiment, rules, indications, or logic for such transitions that are to be monitored may be loaded into a below-operating system trapping agent, such as a hypervisor or virtual machine monitor. Upon encountering such a transition defined by the rules, the hypervisor or virtual machine monitor may generate a virtual machine exit or other notification that may be handled by anti-malware module 110. Anti-malware module 110 may further access malware-access rule logic 108 to determine whether the detected transition is indicative of malware. During handling of the notification, execution may be paused.

The notification made by processor 106 that a rule has been matched may include context information. The information may include an identification of the rule that was matched, the memory location accessed, the memory location originating the access, and any associated parameters such as values resident on the execution stack of processor 106.

Anti-malware module 110 may be configured to track the occurrences of multiple detected transitions to determine whether such transitions include an operational pattern indicative of malware. Such patterns may be defined in, for example, malware-access rule logic 108.

If the one or more detected transitions are not indicative of malware, anti-malware module 110 may be configured to allow the transition. If the one or more detected transitions may be indicative of malware pending additional determined transitions, anti-malware module 110 may be configured to allow the transition but record the transition for possible future corrective action.

Furthermore, if the one or more detected transitions may be indicative of malware pending additional determined transitions, anti-malware module 110 may be configured to load additional rules from malware-access rule logic 108. Such additional rules may, for example, specify additional areas of memory 104 that are to be monitored, additional transitions that are to be tracked, or additional combinations of transitions that are to be tracked. Consequently, the selected malware-access rule logic 108 that are applied may be changed dynamically. Such a dynamic approach may overcome limitations of processor capacity to keep an entire rule set loaded in the processor. Rules may, when needed, dynamically loaded and irrelevant rules discarded. For example, given a rule with three states ("A"-"B"-"C") which initially may not be triggered may match the first state, "A". At such a point, matching for "C" may be discarded as consideration of "C" may be irrelevant without first a matching of "B". Once a transition occurs matching "B", then the rest of the rule regarding "C" may be reloaded. Loading or unloading of the rule branches may be performed by, for example, anti-malware module 110.

Also, one or more detected transitions may be indicative of malware pending additional investigative operations. Such additional investigative operations may include determinations beyond evaluation of transitions. For example, given an execution pattern defined by a set of transitions, malware-access rule logic 108 may define that the source of such actions is to be evaluated using, for example, a hash or digital signature for entities known to be safe or associated with malware. In another example, given an execution pattern defined by a set of transitions, malware-access rule logic 108 define that such actions must have originated from an authorized or verified object, such as a secured portion of the operating system, a signed driver, or a protected function call.

Upon determining that one or more transitions are indicative of malware, anti-malware module 110 may be configured to take any suitable corrective action. For example, the entities in memory 104 associated with the transitions indicating malware may be quarantined, reported, removed, cleaned, or otherwise handled. Furthermore, anything associated with such entities, such as contents in storage or on disk, or other executing processes in memory may be quarantined, reported, removed, cleaned, or otherwise handled.

Certain interrupts or notifications may be defined according to a whitelist of malware-access rule logic 108. Placement of such interrupts or notifications into the whitelist may cause anti-malware module 110 to ignore such interrupts in terms of malware analysis. Such interrupts or notifications may be the result of, for example, known or safe elements of system 100 or may be unrelated to malware and thus require no handling by anti-malware module 110.

Figure 2:
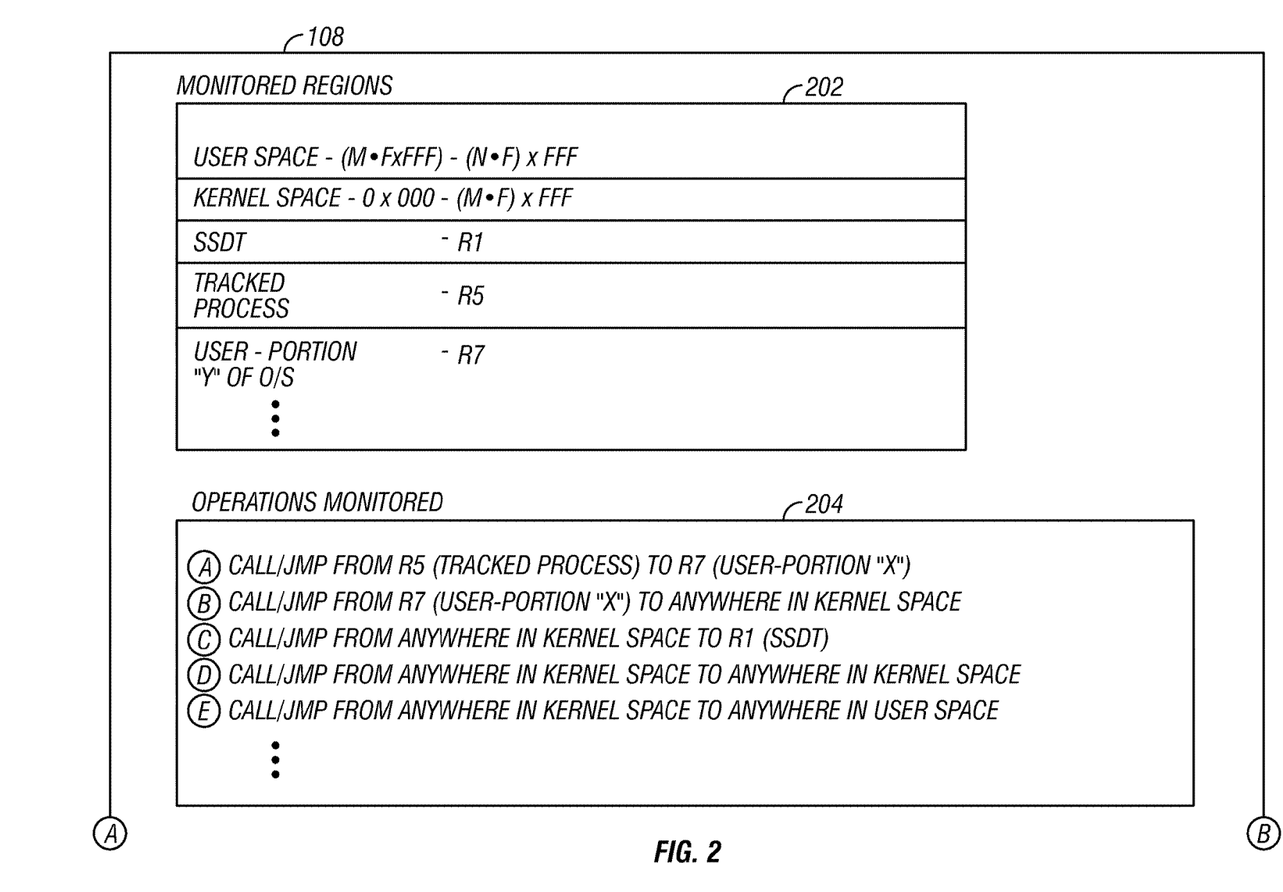
FIG. 2 is an illustration of an example embodiment of malware-access rules.

FIG. 2 is an illustration of an example embodiment of malware-access rule logic 108, by which operation of system 100 may be conducted.

Malware-access rule logic 108 may include monitored regions 202. Monitored regions 202 may define entities that are to be monitored. In one embodiment, monitored regions 202 may define memory ranges of memory 104 for which execution will be profiled by system 100. The memory ranges may be defined according to physical memory addresses or virtual memory addresses, as appropriate. The mapping of the memory ranges corresponding to a given entity may be defined according to, for example, anti-malware module 110 as it tracks the loading and unloading of elements of memory 104. In the example of FIG. 2, monitored regions 202 may define that user space and kernel space are to be monitored. Such monitored regions 202 may define that user space may be resident from addresses (M*FxFFF) through (N*FxFFF), and that kernel space may be resident from addresses (0x000) through (M*FxFFF). Specifically, elements may be defined in monitored regions 202, such as SSDT, a tracked process, and a user-portion "X" of an operating system. Although specific memory address ranges are not detailed in the example of FIG. 2, such addresses may be specified after they are determined. Furthermore, each such region may be given a unique identifier or otherwise labeled for reference by other rules. Kernel space and user space may be referenced as such. The space for SSDT may be denoted as R1, the space for the tracked process may be denoted as R5, and the space for the user-portion "X" of the operating system may be denoted as R7.

Malware-access rule logic 108 may include operations monitored 204, which may specify what transitions or other operations may require handling for malware evaluation. For reference by other of portions of malware-access rule logic 108, each of operations monitored 204 may be denoted by a unique identifier. The unique identifier may thus represent a state of operation in which the monitored operation has occurred. For example, a call, jump, or other branch from R5 (the tracked process) into R7 (the user portion "X") may be considered a transition and marked as state (A). A call, jump, or other branch from R7 (the user portion "X") to anywhere within the kernel space may be considered a transition and be marked as state (B). A call, jump, or other branch from anywhere in the kernel space to R1 (the SSDT) may be considered a transition and be marked as state (C). A call, jump, or other branch anywhere in the kernel space to anywhere else in the kernel space may be considered a transition and be marked as state (D). Such an event may be subject to a minimum distance requirement. A call, jump, or other branch anywhere in the kernel space to anywhere else in the user space may be considered a transition and be marked as state (E).

The specific operation which is monitored within each of operations monitored 204 may include any suitable operation. The operation may be specific to the type of entity. For example, such monitoring may include execution of certain entities in R5 or merely accessing data in the entities in R1.

Malware-access rule logic 108 may include profiling rules 206, which may specify how to handle a given order of encountered operations, such as those defined in operations monitored 204. Each of profiling rules 206 may be represented by, for example, a set of logic requirements or a state machine. For example, given detected operations (A), then (B), then (C), then (D), then (E), profiling rules 206 may indicate that such a detected sequence is representative of malware of a type "XYZ." In one embodiment, the sequence may require no other detected ones of operations monitored 204 to have appeared in between the specified states. Thus, a detected operation sequence of (A)-(B)-(C)-(D)-(E) would trigger the determination that the sequence is representative of malware of a type "XYZ", but a sequence of (A)-(B)-(A)-(C)-(D)-(E) would not be representative of such malware. However, a sequence of (A)-(A)-(B)-(C)-(D)-(E) may match such a pattern. In another embodiment, the sequence may allow other detected ones of operations monitored 204 to have appeared in between the specified states. Thus each of the sequences (A)-(B)-(C)-(D)-(E), (A)-(B)-(A)-(C)-(D)-(E), and (A)-(A)-(B)-(C)-(D)-(E) would match the pattern.

In another example, malware "PDQ" may be defined as a pattern of operations monitored 204 that matches a specified state of a state machine. The logic of the state machine may be implemented in any suitable serious of commands. Such a state machine may specify that, at an original state of operations monitored 204, an observation of (A) will cause monitoring to move to a subsequent state (denoted (A)). Any other observation will cause monitoring to remain at the original state. At monitoring of a state of (A), a subsequent observation of (B) will cause monitoring to move to a subsequent state (denoted (B)); an observation of (A), (C), (D), or (E) will return monitoring to the original state; and any other observation will preserve the present monitoring. At monitoring of a state of (B), a subsequent observation of (C) will cause monitoring to move to a subsequent state (denoted (C)); an observation of (A), (B), (D), or (E) will return monitoring to the original state; and any other observation will preserve the present monitoring. At monitoring of a state of (C), a subsequent observation of (D) will cause monitoring to move to a subsequent state (denoted (D)); an observation of (A), (B), (C), or (E) will return monitoring to the original state; and any other observation will preserve the present monitoring. At monitoring of a state of (D), a subsequent observation of (E) will cause monitoring to move to a subsequent state of determining that malware "PDQ" has been detected; an observation of (A), (B), (C), or (D) will return monitoring to the original state; and any other observation will preserve the present monitoring.

In yet another example, malware "MNO" may be defined as a pattern of operations monitored 204 that matches a specified sequence of a detection of (A), then (B) or (C), then at least three instances of (D), then (E). Thus, the pattern may employ a requirement of multiple instances as well as logical conditions for possible malicious behavior.

In still yet another example, malware "JKL" may be defined as a pattern of operations monitored 204 that matches a specified sequence of a detection of (A), then no more than three instances of (B), then (D), then (E), but without encountering (C). Thus, the pattern may employ a requirement of no more than a specified number of instances, as well as requirements that some conditions not be observed.

Note that provided examples should not be viewed as an exhaustive description of all possible rule combinations and implementations. Any other algorithmic combination of transitions or events may be implemented in malware-access rule logic 108. Such algorithms, for example, can be represented as a script, table, graph or in any other suitable way.

Profiling rules 206 may thus specify behavior of a general type of malware without relying upon signature identification of a particular entity as malware. Polymorphic malware, which may change its own content (and consequently, signature) without its overall functionality, may thus be detected. Furthermore, unusual or unexpected patterns of operation may be detected. Such unusual or unexpected patterns of operation may reflect a new, unknown kind of malware. For example, a process may match a given prefix of a sequence of operation that otherwise may indicate operation of a trusted process, but then perform an atypical access for such a trusted process. In such cases, one of profiling rules 206 may specify that, given a series of preliminary operations, anything except a defined, expected set of operations to finish the sequence may be indicative of malware.

Figure 3:
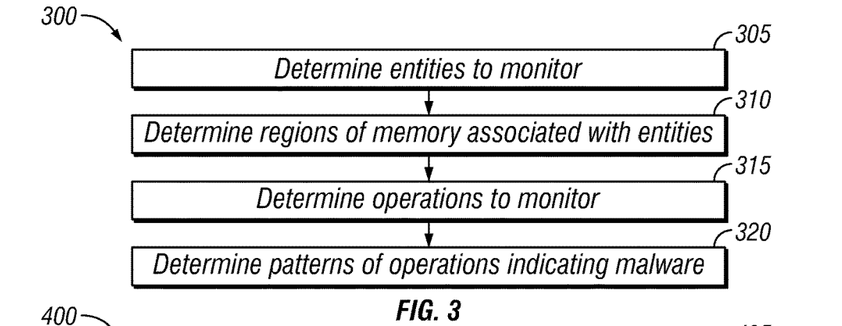
FIG. 3 is an illustration of an example embodiment of a method for determining rules or malware-access rule logic for profiling code execution.

FIG. 3 is an illustration of an example embodiment of a method 300 for determining rules or malware-access rule logic for profiling code execution. Determinations of method 300 may be performed by, for example, anti-malware research; profiling a specific electronic device or entities thereof; profiling a class of electronic device or entities thereof; accessing an anti-malware server; accessing anti-malware rule logic; reading anti-malware definition files; or through any other suitable process. The result of method 300 may be the availability of one or more anti-malware rules by which code execution may be profiled.

At 305, entities of an electronic device to be monitored may be determined. Such entities may include, for example, kernel space, user space, an SSDT, an operating system call dispatcher, system DLLs, user DLLs, processes, I/O ports, heaps, threads, or a system stack. At 310, regions of memory associated with such entities may be determined as such entities reside on the electronic device. At 315, operations upon the regions of memory and entities may be determined to be monitored. Such operations may include, for example, jumps, calls, or other branches of execution. The operations may be defined directionally, from one memory region to another. Furthermore, the operations may require a minimum branching distances between the regions. At 320, patterns of the operations to be monitored may be determined. Such patterns may specify particular orders of the operations through commands, logic, or state machines. The patterns may represent, for example, behavior of malware or of known safe components.

Figure 4:
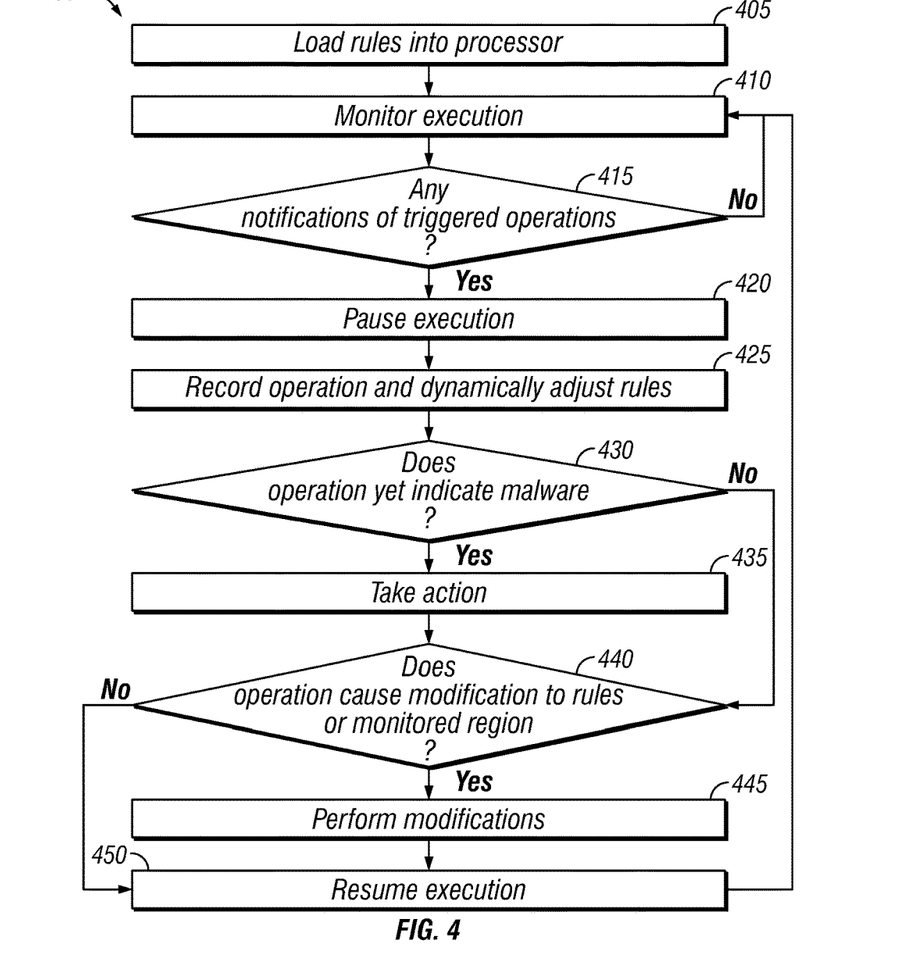
FIG. 4 is an illustration of an example embodiment of a method for profiling code execution.

FIG. 4 is an illustration of an example embodiment of a method 400 for profiling code execution. Method 400 may be performed for profiling code execution on an electronic device.

At 405, rules, commands, or instructions embodying the operations to monitor and the patterns of operation may be loaded into a suitable trapping agent, such as a processor, hypervisor, or anti-malware module. Observed activities within the electronic device matching one of the rules may cause an interrupt, exception, or other notification that is to be handled. Such rules, commands, or instructions may be determined through any suitable manner or mechanism. For example, performance of method 300 may result in rules that may be loaded in 405.

At 410, execution on the electronic device may be monitored. Execution matching the defined operations may cause a notification such as an interrupt or an exception to be generated. At 415, it may be determined whether any such notifications have been created. If so, method 400 may proceed to 420. If not, method 400 may return to 410.

At 420, execution of the electronic device may be paused. At 425, the observed operation may be recorded. Although the present instance of the observed operation may or may not indicate malware, the present instance in combination with a subsequently observed operation may indicate malware. Furthermore, dynamic reconfiguration, loading, or unloading of rule patterns may be performed.

At 430, it may be determined whether the operation indicates malware. Such a determination may be made in view of previously observed operations that were recorded. The determination may be made according to patterns of operation determined in method 300 and loaded in 405. If the observed operation indicates malware, then method 400 may proceed to 435. If the observed operation does not indicate malware, then method 400 may proceed to 440.

At 435, subsequent action may be taken. Any suitable action, such as notification, software exception triggering to operating systems or security software, quarantining, taking the compromised device off a network, cleaning, or removing the entity making the operation may be taken—or allowance may be taken. Furthermore, other entities associated with the operation may be determined and subsequently quarantined, cleaned, or removed.

At 440, it may be determined whether the observed operation causes a need for any modifications, additions, subtractions, or other changes to the existing rules that are to be applied. Such changes may include, for example, changes to the entities or memory that is to be monitored, changes to the operations that are to be detected, or changes to the operation patterns that are to be matched. If no changes are needed, method 400 may proceed to 450. If changes are needed, in 445 such modifications may be performed and new rules loaded into the appropriate trapping mechanism. At 450, execution may resume. Method 400 may return to 410.

Methods 300 and 400 may be implemented using the system of FIGS. 1-2 or any other system operable to implement methods 300 and 400. As such, the preferred initialization point for methods 300 and 400 and the order of the elements comprising methods 300 and 400 may depend on the chosen implementation. In some embodiments, some elements may be optionally omitted, repeated, or combined. In certain embodiments, methods 300 and 400 may be implemented partially or fully in software embodied in computer-readable media. Methods 300 and 400 may be performed by the same or different users, actors, electronic devices, modules, or other entities.

For the purposes of this disclosure, computer-readable media may include any instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory; as well as communications media such wires, optical fibers, and other electromagnetic and/or optical carriers; and/or any combination of the foregoing.

As described above, malware may make changes to itself so as to disguise its identity. Furthermore, malware authors may make changes to malware to disguise itself. Changing the contents of malware may lead to a change in a digital hash or signature of the malware. Consequently, checking the identities of entities on the electronic device against a list of known malware signatures may not identify such changed malware. Code or execution analysis of static code may similarly be ineffective, as the code may change in such polymorphic malware.

An advantage of system 100 and methods 300 and 400 may include detecting such modified malware. Such detection may be performed by providing reliable detection of the underlying algorithms behind malware. Furthermore, system 100 and methods 300 and 400 may provide such dynamic profiling of execution without requiring hooking into application programming interface calls, kernel events, or the like. By performing recognition by rules loaded within a processor, the behavioral analysis may be conducted at native processor speed.

The following examples pertain to further embodiments. Specifics in the examples may be used anywhere in one or more embodiments described above or herein.

In Example 1, a system for securing an electronic device may include a memory and set of malware-access rule logic resident in the memory. The set of malware-access rule logic may include an identification of a plurality of entities of the electronic device to be monitored, an identification of one or more operations between the entities to be monitored, and an identification of a pattern of the operations to be monitored. The system may include a processor coupled to the memory and configured to, based upon the set of malware-access rule logic, generate a notification that one of the operations has occurred. The system may include an anti-malware module configured to, based on the notification and the pattern of the operations, determine whether the operations are indicative of malware. The anti-malware module may be further configured to, based on the notification and the pattern of the operations, identify an additional element of malware-access rule logic comprising an identification of an additional entity, operation between entities, or pattern of operations to be monitored. The anti-malware module may be further configured to, based on the notification and the pattern of the operations, perform a signature check on the cause of the operation. The operations to be monitored may include an execution branch between the entities. The operations to be monitored may include a direction of an execution branch between the entities. The operations to be monitored may include an execution branch of a specified distance. The operations to be monitored may include an instruction pointer change. The operations to be monitored may include instruction fetching. The operations to be monitored may include a frequency of operation. The operations to be monitored may include a duration of execution measured in instructions. The operations to be monitored may include a duration of execution measured in execution cycles or clock cycles. The operations may be monitored by a hypervisor or virtual machine monitor. The entities monitored may include kernel space, user space, SSDTs, DLLs, I/O port addresses, operating system call dispatchers, processes, threads, or other suitable entities. The notification may include an exception or an interrupt. The pattern may include an enumeration of a number of times the operation has been executed. The pattern may include a requirement that a particular operation has not been observed. The pattern may include logical constraints of one or more of its elements.

In Example 2, a method for securing an electronic device may include monitoring execution of the electronic device based on a set of malware-access rule logic. The set of malware-access rule logic may include an identification of a plurality of entities of the electronic device to be monitored, an identification of one or more operations between the entities to be monitored, and an identification of a pattern of the operations to be monitored. The method may father include generating a notification that one of the operations has occurred based upon set of malware-access rule logic, and, based on the notification and the pattern of the operations, determining whether the operations are indicative of malware. The method may further include, based on the notification and the pattern of the operations, identifying an additional element of malware-access rule logic comprising an identification of an additional entity, operation between entities, or pattern of operations to be monitored. The method may further include, based on the notification and the pattern of the operations, performing a signature check on the cause of the operation. The operations to be monitored may include an execution branch between the entities. The operations to be monitored may include a direction of an execution branch between the entities. The operations to be monitored may include an execution branch of a specified distance. The operations to be monitored may include an instruction pointer change. The operations to be monitored may include instruction fetching. The operations to be monitored may include a frequency of operation. The operations to be monitored may include a duration of execution measured in instructions. The operations to be monitored may include a duration of execution measured in execution cycles or clock cycles. The operations may be monitored by a hypervisor or virtual machine monitor. The entities monitored may include kernel space, user space, SSDTs, DLLs, operating system call dispatchers, processes, threads, I/O ports, or other suitable entities. The notification may include an exception or an interrupt. The pattern may include an enumeration of a number of times the operation has been executed. The pattern may include a requirement that a particular operation has not been observed. The pattern may include logical constraints of one or more of its elements.

In Example 3, at least one machine-readable storage medium may include computer-executable instructions carried on the computer readable medium. The may be instructions readable by a processor. The instructions, when read and executed, may cause the processor to monitor execution of the electronic device based upon a set of malware-access rule logic. The set of set of malware-access rule logic may include an identification of a plurality of entities of the electronic device to be monitored, an identification of one or more operations between the entities to be monitored, and an identification of a pattern of the operations to be monitored. The instructions may further cause the processor to generate a notification that one of the operations has occurred based upon the malware-access rule logic, and, based on the notification and the pattern of the operations, determine whether the operations are indicative of malware. The processor may be caused to, based on the notification and the pattern of the operations, identify an additional element of malware-access rule logic comprising an identification of an additional entity, operation between entities, or pattern of operations to be monitored. The processor may be further caused to, based on the notification and the pattern of the operations, perform a signature check on the cause of the operation. The operations to be monitored may include an execution branch between the entities. The operations to be monitored may include a direction of an execution branch between the entities. The operations to be monitored may include an execution branch of a specified distance. The operations to be monitored may include an instruction pointer change. The operations to be monitored may include instruction fetching. The operations to be monitored may include a frequency of operation. The operations to be monitored may include a duration of execution measured in instructions. The operations to be monitored may include a duration of execution measured in execution cycles or clock cycles. The operations may be monitored by a hypervisor or virtual machine monitor. The entities monitored may include kernel space, user space, SSDTs, DLLs, I/O ports, operating system call dispatchers, processes, threads, or other suitable entities. The notification may include an exception or an interrupt. The pattern may include an enumeration of a number of times the operation has been executed. The pattern may include a requirement that a particular operation has not been observed. The pattern may include logical constraints of one or more of its elements.

In Example 4, a system for securing an electronic device may include means for monitoring execution of the electronic device based upon a set of malware-access rule logic. The set of set of malware-access rule logic may include an identification of a plurality of entities of the electronic device to be monitored, an identification of one or more operations between the entities to be monitored, and an identification of a pattern of the operations to be monitored. The system may further include means for generating a notification that one of the operations has occurred based upon the set of malware-access rule logic, and, based on the notification and the pattern of the operations, determining whether the operations are indicative of malware. The system may further include means for, based on the notification and the pattern of the operations, identifying an additional element of malware-access rule logic comprising an identification of an additional entity, operation between entities, or pattern of operations to be monitored. The system may further include means for, based on the notification and the pattern of the operations, performing signature check on the cause of the operation. The operations to be monitored may include an execution branch between the entities. The operations to be monitored may include a direction of an execution branch between the entities. The operations to be monitored may include an execution branch of a specified distance. The operations to be monitored may include an instruction pointer change. The operations to be monitored may include instruction fetching. The operations to be monitored may include a frequency of operation. The operations to be monitored may include a duration of execution measured in instructions. The operations to be monitored may include a duration of execution measured in execution cycles or clock cycles. The operations may be monitored by a hypervisor or virtual machine monitor. The entities monitored may include kernel space, user space, SSDTs, DLLs, I/O ports, operating system call dispatchers, processes, threads, or other suitable entities. The notification may include an exception or an interrupt. The pattern may include an enumeration of a number of times the operation has been executed. The pattern may include a requirement that a particular operation has not been observed. The pattern may include logical constraints of one or more of its elements.

Specifics in the examples above may be used anywhere in one or more embodiments.

Although the present disclosure has been described in detail, it should be understood that various changes, substitutions, and alterations can be made hereto without departing from the spirit and the scope of the disclosure as defined by the appended claims.

What is claimed is:

1. A system for securing an electronic device, comprising:
   a processor;
   a non-transitory machine readable medium communicatively coupled to a hardware processor; and
   an anti-malware module including instructions on the non-transitory machine readable medium, the instructions, when loaded and executed by the processor, cause the processor to:
      identify a plurality of memory regions of the electronic device to be monitored, each memory region representing a respective CPU address space;
      identify one or more operations representing transitions between the memory regions to be monitored, including an identification of an instruction fetch to be monitored;
      identify a pattern of the operations to be monitored according to the identification of the instruction fetch, the pattern including a series of a plurality of defined operations representing transitions between a first memory region representing a kernel space and a second memory region representing a user space;
      determine that the identified pattern of the operations has occurred;
      generate and record a notification that the identified pattern of the operations has occurred;
      based on the notification and the pattern of the operations, determine whether the identified pattern of the operations is indicative of malware; and
      take corrective action in response to determining that the identified pattern of the operations has occurred and is indicative of malware.

2. The system of claim 1, wherein the operations to be monitored include an execution branch between two of the memory regions.

3. The system of claim 1, wherein the operations to be monitored include an instruction pointer change.

4. The system of claim 1, wherein the anti-malware module further includes instructions to cause the processor to:
   based on the notification and the pattern of the operations, identify an additional element of malware-access rule logic to be applied, the additional element comprising an identification of an additional entity, operation between entities, or pattern of operations to be monitored.

5. The system of claim 4, wherein the notification includes an exception.

6. The system of claim 1, wherein the pattern includes an enumeration of a number of times a monitored operation has been executed.

7. The system of claim 1, wherein the pattern includes a series of a plurality of defined operations, the defined operations to include an enumeration of a maximum number of times a monitored operation is to be executed and be indicative of malware.

8. The system of claim 1, wherein the pattern specifies a series of a plurality of operations including a first matched operation and a second matched operation, wherein a variable number of other operations are to be executed between the first matched operation and the second matched operation.

9. A method for securing an electronic device, comprising:
   monitoring execution of the electronic device based on a set of malware-access rule logic;
   identifying a plurality of memory regions of the electronic device to be monitored, each memory region representing a respective CPU address space;
   identifying one or more operations representing transitions between the memory regions to be monitored, including an identification of an instruction fetch to be monitored;
   identifying a pattern of the operations to be monitored according to the identification of the instruction fetch, the pattern including a series of a plurality of defined operations representing transitions between a first memory region representing a kernel space and a second memory region representing a user space;
   generating and recording a notification that the identified pattern of the operations has occurred based upon the set of malware-access rule logic;
   based on the notification and the pattern of the operations, determining whether the identified pattern of the operations is indicative of malware; and
   taking corrective action in response to determining that the identified pattern of the operations is indicative of malware and has occurred.

10. The method of claim 9, wherein the operations to be monitored include an execution branch between two of the memory regions.

11. The method of claim 9, wherein the operations to be monitored include an instruction pointer change.

12. The method of claim 9, further comprising, based on the notification and the pattern of the operations, determining an additional element of malware-access rule logic to be applied, the additional element comprising an identification of an additional entity, operation between entities, or pattern of operations to be monitored.

13. The method of claim 9, wherein the notification includes a processor exception.

14. The method of claim 9, wherein the pattern includes an enumeration of a number of times a monitored operation has been executed.

15. At least one non-transitory machine readable storage medium, comprising computer-executable instructions carried on the machine readable medium, the instructions readable by a processor, the instructions, when read and executed, for causing the processor to:
  monitor execution of an electronic device based on a set of malware-access rule logic;
  identify a plurality of memory regions of the electronic device to be monitored, each memory region representing a respective CPU address space;
  identify one or more operations representing transitions between the memory regions to be monitored, including an identification of an instruction fetch to be monitored;
  identify a pattern of the operations to be monitored according to the identification of the instruction fetch, the pattern including a series of a plurality of defined operations representing transitions between a first memory region representing a kernel space and a second memory region representing a user space;
  generate and record a notification that the identified pattern of the operations has occurred based upon the set of malware-access rule logic;
  based on the notification and the pattern of the operations, determine whether the identified pattern of the operations is indicative of malware; and
  take corrective action in response to determining that the identified pattern of the operations is indicative of malware and has occurred.

16. The medium of claim 15, wherein the operations to be monitored include an execution branch between two of the memory regions.

17. The medium of claim 15, wherein the operations to be monitored include an instruction pointer change.

18. The medium of claim 15, further comprising instructions for causing the processor to, based on the notification and the pattern of the operations, identify an additional element of malware-access rule logic to be applied, the additional element comprising an identification of an additional entity, operation between entities, or pattern of operations to be monitored.

19. The medium of claim 15, wherein the notification includes a processor exception.

20. The medium of claim 15, wherein the pattern includes an enumeration of a number of times a monitored operation has been executed.

* * * * *